United States Patent [19]

Bourgeois

[11] Patent Number: 5,309,412
[45] Date of Patent: May 3, 1994

[54] ELEMENT RELEASING SYSTEM

[75] Inventor: Armand E. Bourgeois, Manchester, N.H.

[73] Assignee: Lockheed Sanders, Inc., Nashua, N.H.

[21] Appl. No.: 809,338

[22] Filed: Jun. 23, 1977

[51] Int. Cl.$^5$ ............................................. G01S 15/00
[52] U.S. Cl. .................................. 367/154; 367/106; 367/130
[58] Field of Search .......................... 340/2, 3 T, 7 R; 114/254, 253, 249, 251; 367/106, 130, 154

[56] References Cited

U.S. PATENT DOCUMENTS 3,800,271  3/1974  Stillman, Jr. ............................. 340/2
3,944,964  3/1976  Loeser et al. ............................ 340/2

Primary Examiner—Daniel T. Pihulic
Attorney, Agent, or Firm—David W. Gomes

[57] ABSTRACT

A system for storing and deploying a number of elements sequentially in connected but spaced-apart relationship is described. Adjacent elements are joined together temporarily by connectors which overlay adjacent elements. The connectors are bound to the elements by a plurality of cables, one of which is wound around each element and the overlying connectors. One end of each cable is connected to the element around which it is wound and the other end is connected to the next preceding element. When tension is applied between the cable of the first element and the last element, for example, by connecting an underwater tug to the cable and connecting a drogue to the last element, the cables unwind one by one releasing the connectors and extending the elements in a straight line, spaced apart by the length of the connecting cables.

16 Claims, 2 Drawing Sheets

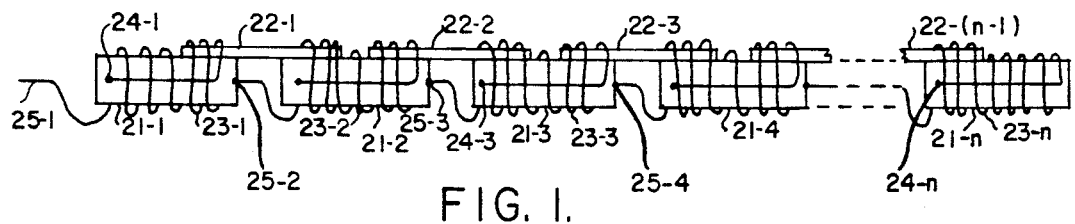
FIG. 1.
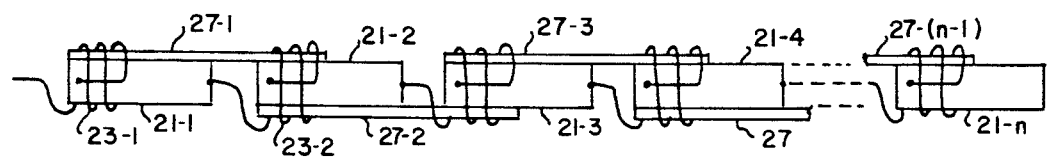
FIG. 2.
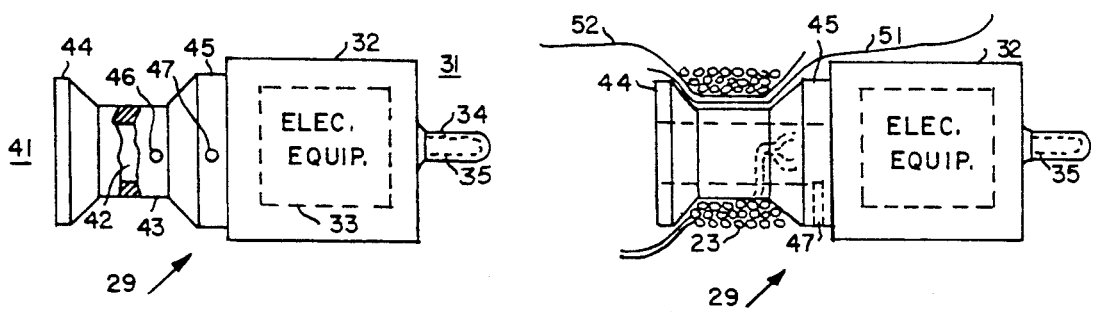
FIG. 3.
FIG. 4.
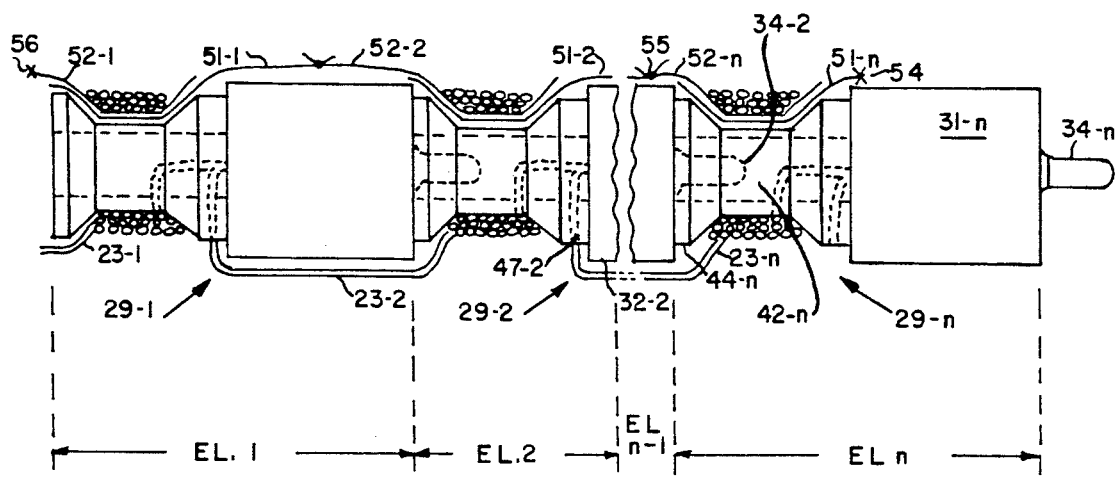
FIG. 5.

ELEMENT RELEASING SYSTEM

FIELD OF THE INVENTION

This invention relates generally to methods and apparatus for storing and then deploying sequentially a number of elements and is particularly useful in connection with underwater surveillance systems employing a linear array comprising many elements.

BACKGROUND OF THE INVENTION

Linear arrays for underwater surveillance typically comprise a plurality of elements, a dozen or more, spaced apart by predetermined distances but joined together by flexible cables. Such arrays may be installed in many ways. For example, they may be held in a fixed position beneath the surface by being fastened to two anchors or other stationary objects. They may be suspended by surface or subsurface floats or combinations thereof. They may be towed by a surface vessel. They may be towed or at least held in a straight line, by a subsurface tug or thruster.

The storage, transportation and deployment of linear arrays presents problems. During storage, the assembly should occupy a minimum amount of space which, as a practical matter, means that the cables joining the elements together must be coiled or wound up in some fashion. It should be possible to deploy the array readily for example, by dropping it from a surface vessel or aircraft. Upon entering the water it should descend to the predetermined depth and then extend. Heretofore, considerable difficulty has been experienced in getting the elements to extend from their compact storage configuration to their fully extended operable position. A major difficulty has been that after entering the water, the elements tend to separate from each other in a random fashion with the result that the connecting cables frequently become entangled causing degraded performance unless considerable time and effort is expanded to straighten the array.

It is a purpose of the present invention to provide an improved system for storing and deploying a plurality of spaced apart, connected elements.

SUMMARY OF THE INVENTION

Briefly stated, a system incorporating the present invention includes a plurality of elements positioned adjacent to each other during storage and a plurality of connectors overlaying and engaging each two adjacent elements. The connecting cables are wound around and over the elements and connectors thereby fastening the elements together temporarily. Tension applied to a cable at one end and to the element at the opposite end causes the cables to unwind one at a time, releasing the connectors and separating the elements sequentially.

More particularly, one embodiment of the invention comprises a plurality of elements positioned adjacent to each other in a substantially straight line and in a predetermined order from first to last, a plurality of connectors positioned so that one of said connectors overlies and is in engagement with each two adjacent elements, bridging any gap therebetween, and a plurality of flexible cables, one associated with each element, and each having a first end and a second end, each of said cables being wound around its associated element and each connector in engagement therewith so as to bind the connectors to the elements and thereby join the elements to each other, said first end of each cable being fastened to its associated element, said second end of each of said cables except the first being connected to the next preceding adjacent element, whereby the application of a force to said second end of said first cable and said last element in a direction tending to separate the elements causes said cables to unwind sequentially beginning with the first cable thereby releasing said connectors one at a time and separating said elements which remain joined together by said cables.

BRIEF DESCRIPTION OF THE DRAWINGS

For a clearer understanding of the invention reference may be made to the following detailed description and the accompanying drawing in which:

FIG. 1 is a schematic diagram illustrating one form of the invention;

FIG. 2 is a schematic diagram illustrating a slightly different form of the invention;

FIG. 3 is a schematic elevation diagram of a preferred form of element before any connectors or cables are applied;

FIG. 4 is a schematic diagram of the element of FIG. 3 showing connectors and a cable applied thereto;

FIG. 5 is a schematic diagram showing how several elements are connected together;

DESCRIPTION OF PREFERRED EMBODIMENT

Figure 6:
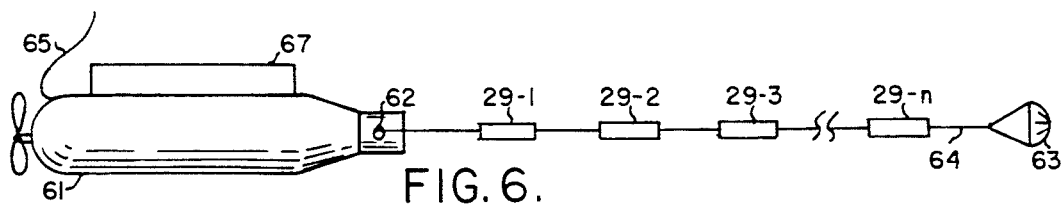
FIG. 6 is a schematic diagram showing a group or section of many elements deployed and held in a straight line by a thruster and a drogue.

Referring first to FIG. 1 there are shown a plurality of elements indicated generally by the reference character 21 and more specifically by the reference characters 21-1, 21-2 . . . 21-n. These elements are placed adjacent to each other substantially in a straight line as shown and in the order shown, that is, starting with the first, 21-1 and ending with the last, 21-n. A plurality of connectors are indicated generally by the reference character 22 and more specifically by the reference characters 22-1, 22-2, . . . 22-n−1. The connectors are positioned so that one connector overlays and is in engagement with each two adjacent elements and extends across any gap between the elements. Also shown in FIG. 1 are a plurality of flexible cables 23-1, 23-2, . . . 23-n, one for each of the elements. Each cable has a first end 24 and a second end 25. As before, the ends of the various cables are distinguished by the suffixes -1, -2, . . . -n where such distinction is necessary.

Referring particularly to element 21-3, its associated cable 23-3 has its first end 24-3 connected to its associated element, 21-3. The cable is then wound around and over its associated element and over each connector 22 which is in engagement with that element. It can be seen that there are two connectors, 22-2 and 22-3 which are in engagement with the element 21-3 and accordingly, the cable 23-3 is wound around these connectors so as to bind the connectors to this element. The second end, 25-3, is connected to the next preceding element, namely element 21-2. The other cables except those associated with the first and the last elements are similarly wound around two connectors and have their first ends connected to their associated elements and their second ends connected to the next preceding element. The last cable 23-n has but one connector around which it may be wound but its second end is connected to the next preceding element as previously described. The cable 23-1 of the first element likewise has but one connector around which it is wound and there is no preceding element to which its second end 25-1 can be attached. It is apparent that if one were to grasp the last element, 21-n, and the second end 25-1 of the first cable and exert a force on element 21-n to the right and on the cable 25 to the left, thereby tending to separate the elements, the cable 23-1 would start to unwind eventually releasing the forward end of connector 22-1. The cable 23-1 would, at this time, be completely extended and exert a force on element 21-1 which would in turn exert a force on cable 23-2 thereby starting to unwind this cable. After partial unwinding, the rearward end of connector 22-1 would be released and this connector would drop away. Eventually, the cable 23-2 would become completely extended and the elements 21-1 and 21-2 would be separated by the length of the cable 23-2. At this time the forward end of connector 22-2 would be free and the cable 23-3 would start to unwind. This sequence of operations would continue from the first element to the last until finally all of the elements were extended but separated from each other by the length of the cables connecting them.

Referring now to FIG. 2 there is shown another arrangement in accordance with the invention which is quite similar to the arrangement of FIG. 1. The elements 21-1 . . . 21-n are the same as before. However, the connectors 27 are a bit longer so that each one extends entirely over one element and over a portion of the next adjacent element. For example, the connector 27-1 extends entirely over the length of the element 21-1 and over part of the element 21-2. The connector 27-2 extends over the entire length of element 21-2 and over part of the element 21-3. It is to be noted that the connectors 27-1 and 27-2 overlap each other, that is, they both overlie and are in engagement with the forward portion of element 21-2. This makes it possible for the cable 23-2 to bind both connectors to the element 21-2 without the necessity of it being wound around the entire length of the element. As shown, it need only be wound around the forward portion of the element 21-2. It is believed to be apparent that the operation is substantially identical to the operation of the device shown in FIG. 1.

The connectors 22 of FIG. 1 and 27 of FIG. 2 may be of various kinds. They may be rigid bars or flexible cables or even pieces of string. They may each be all in one piece or they may each comprise two or more pieces as will be more fully discussed subsequently.

Referring now to FIG. 3, there is shown a preferred form of element 29. This element comprises a sensor indicated generally by the reference character 31 which in turn includes a generally cylindricalyhousing 32 which contains electronic equipment 33. This equipment includes the usual pre-amplifiers, multiplexers, etc. (not shown). Fastened to the large cylindrical housing 32 is a smaller generally cylindrical housing 34 containing an electro-acoustic transducer 35.

Fastened to the housing 32 is a spool indicated generally by the reference character 41 which is a generally cylindrical tube which defines a generally cylindrical interior chamber 42. The spool includes a generally cylindrical central body portion 43 and a radially extending flange 44 on the left end as viewed in FIG. 3. Another radially extending flange 45, slightly wider than the flange 44, is on the right end as viewed in this Figure and this latter flange is fastened to the housing 32 in any suitable manner, for example, by means of machine screws or an adhesive. The body portion 43 is formed with a small radially extending aperture 46 and the flange 45 is formed with a similar aperture 47. These apertures provide communication between the interior chamber 42 and the exterior of the spool 41.

Referring now to FIG. 4, there is shown, rotated 90° degrees, the same element as shown in FIG. 3 but with the addition of connectors and a cable. In preparing the element as shown in FIG. 4, the first end of the cable 23 is inserted into the aperture 46 leaving sufficient slack to make connections. Next, a connector 51 is laid in place. This connector is assumed to be a flexible connector such as a piece of fabric, (e.g., nylon) or a flexible wire, or a piece of string. One end is positioned approximately on top of the flange 44 and then the connector is laid on top of the body portion 43, over the flange 45 and over the housing 32. Then another similar connector 52 is placed with one end along the flange 45, then along the body 43 then over the flange 44 and allowed to extend toward the left. The connector 52 may be placed over the connector 51 as shown or, alternatively, it could be displaced circumferentially therefrom. With the connectors 51 and 52 in place, the cable 23 is wound around and around between the flanges 44 and 45 as shown, the total length being that desired to be obtained between this element 29 and the next preceding element 29.

It is convenient to prepare all of the elements as just explained in connection with FIGS. 3 and 4 before they are assembled together. If the spacing between elements is to be identical in all cases, then the length of the cables 23 may be the same. However, in some cases it may be desired that the spaces be different in which case different lengths of the cable 23 will be wound around different spools 41.

FIG. 5 shows how the elements are assembled and connected together for transportation and storage. At the left is shown the first element, element no. 1 and adjacent to it a portion of the second element, element no. 2. As many additional elements as desired can be added after element no. 2 and there is shown a portion of the next to the last element, element n-1, and finally, at the extreme right is the last element, element n. The array is assembled by first selecting one element wound as shown in FIG. 4 as the last, or, nth element. The first end of the cable 23 of this element, the end which was previously inserted into the aperture 46, is electrically and mechanically connected to the sensor 32 by working from the left end of the hollow spool through the chamber 42. Connections may be made in any various ways, for example, by crimping or soldering the appropriate conductors with the cable 23 to conductors protruding from the sensor 33 or by means of plug-in connectors. Since this is the last element, there will be no cable inserted into the aperture 47 of this element. After the connections are made, it is preferable to fill the chamber 42 to approximately one third to one half full of potting compound to provide mechanical strength, electrical insulation, and waterproofing. Since this is the last element, there is no element to the right to which the connector 51 can be joined and it may be cut off close to the flange 45 as indicated by the X54. It would have been possible to omit this connector 51 entirely, but in many cases it is more convenient to insert all of the connectors in all of the elements at the time they are wound with cable.

Next, another element is selected to be the next to the last, or (n-1)th element. For the purpose of explanation it will be assumed that, in FIG. 5, element no. 2 and element no. n-1 are one and the same element, although it will be understood that many additional elements would normally be placed between these two. Element no. 2 is held in alignment with and adjacent to the nth element with the housing 34-2 projecting into the chamber 42-n and with the housing 32-2 in engagement with flange 44-n. Next, the connector 51-2 extending to the right, and connector 52-n, extending to the left, are joined together. The join is shown schematically in FIG. 5 as a knot 55, assuming that the connectors are strings or flexible wires or the like.

Next, the second end of the cable 23-n is inserted into the aperture 47-2 so as to extend into the chamber 42. This cable, and the first end of cable 23-2 are next connected to the sensor 31 by soldering, by means of plug-in connectors, or any other suitable manner. Then the chamber 42 is preferably filled one third or one half full of potting compound.

Next, another element is selected to be the first element and is fastened to element no. 2 in the manner just explained. In this case, the connector 52-1 is superfluous and may be cut off closely as indicated by the X56. The second end of the cable 23-1 is left extending to the left for the time being.

When all of the elements have been assembled, as above, the result is a series of adjacent elements arranged in a substantially straight line with connectors overlying and in engagement with adjacent elements. The connectors are bound to the element by the various cables. If a force be applied between the cable 23-1 and the element 29-n, the cable 23-1 will start to unwind. When fully unwound, it will release connector 52-1 (which is only a stub) and also connector 51-1. The force applied to cable 23-1 is now applied directly to the first element, element 29-1, and since connector 51-1 has been released, the element 29-1 is free to separate from the second element, element 29-2. As it separates, the force is transferred to cable 23-2 which in turn starts to unwind. When fully unwound, connector 52-2 is released so that this connector, and the connector 51-1 to which it is fastened, are released and fall away. Also, the connector 52-2 is released and element 2 is free to separate from element 3. The process continues until all of the cables are unwound leaving the elements extended in a substantially straight line and separated by the cables joining them.

Typically the tension is applied to the cable 23-1 by a thruster or tug 61 to which the cable is fastened in any suitable manner, shown schematically by the fastener 62 in FIG. 6. The drag or retarding force is exerted by a drogue 63 fastened to the element 29-n by a cable 64. The cable 23-1 is connected either exteriorly or interiorly to a cable 65 which comprises a portion of a communication link connecting the various elements to a suitable processor (not shown) all as is well known in the art.

Figure 7:
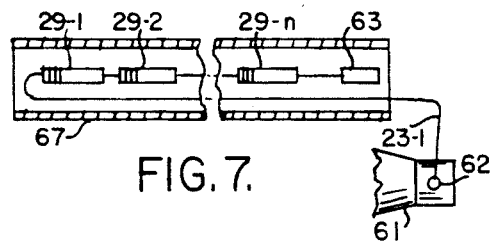
FIG. 7 is a schematic diagram illustrating the storage of the elements of a section in a tubular container.

Before deployment, while all the cables are wound around the spools as shown in FIG. 5, the elements may be stored in a hollow tube such as the tube 67 which is permanently fastened to tug 61. As shown schematically in FIG. 7, the elements are arranged end to end in the tube along with a package containing the drogue 63. For the sake of clarity the elements are shown in FIG. 7 as being separated slightly although it will be understood that actually they are closely adjacent as shown in FIG. 5. The cable 23-1 extends back through the tube 67 as shown in FIG. 7 and is connected to the tug at the fastener 62.

Figure 8:
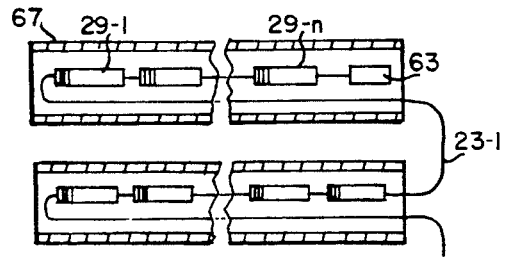
FIG. 8 is a schematic diagram illustrating the thruster with a plurality of tubular containers fastened thereto.
Figure 8:
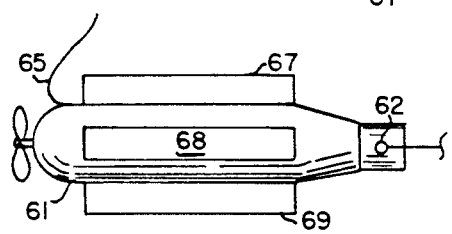

The invention has been described so far as comprising but a single section of elements packaged in a single tube. However, the invention is also applicable to several sections of elements, each packaged in its own separate tube. In FIG. 8 there are shown three tubes, 67, 68, and 69 fastened to the tug 61. One embodiment of the invention comprises eight sections of elements packaged in eight tubes, all fastened to the tug 61, and each section comprising seven elements.

Figure 9:
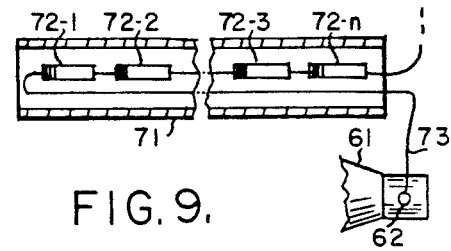
FIG. 9 is a schematic diagram showing many sections of elements, each section being stored in a different tubular container.

FIG. 9 shows schematically how the cables are connected when using multiple sections. Assuming that the first section is the section previously described and packaged in the tube 67, the cable 23-1, instead of being connected directly to the tug 61, is connected indirectly to the tug 61 by way of the other sections. As shown in FIG. 9, the cable 23-1 is connected to the nth element of the next section while cable connected to the first element of this section is doubled back down through its tube and is connected to the nth element of the next section. As many sections as desired are connected in this manner. In FIG. 9 the last section is packaged in tube 71 and the elements are designated 72-1, 72-2 . . . 72-n. The cable 73, connected to the element 72-1, is doubled back through the tube 71 and is connected to the tug 61 by means of the fastener 62.

In operation, the tug 61 with one or more tubes containing elements fastened thereto is deposited in the water, for example, by being dropped from an aircraft or from a surface vessel. Upon such deployment, a timer is started and, when a predetermined time has elapsed, a mechanism is operated which ejects the drogue 63 and starts the motor of the tug 61. The element 29-n will be pulled out of the tube first followed by the other elements in the tube 67. If this is the only tube, the cable 23-1 of the element 29-1 will start to unwind as previously explained. If there are several tubes, as shown in FIG. 9, then the cable 23-1 will exert a pull on the nth element of the next section. The cable 23-1 may start to unwind at this point or alternatively, it may pull the elements out of the next tube. In fact, it is possible that all of the elements will be pulled out of all of the tubes before the cable 23-1 starts to unwind. On the other hand, the cable 23-1 may unwind before pulling out the elements of the next section. It is also possible that unwinding could occur in several sections simultaneously but since they are spaced apart by a considerable distance they do not interfere with each other. In any event, the elements in any one section will be released from each other sequentially starting with the first element and ending with the last element.

Figure 10:
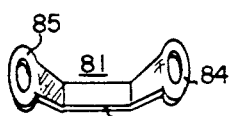
FIG. 10 is a schematic diagram of one part of a multi-part connector.
Figure 11:
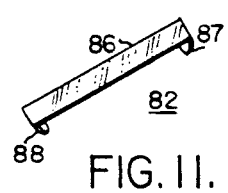
FIG. 11 is a schematic diagram of another part of a multi-part connector.
Figure 12:
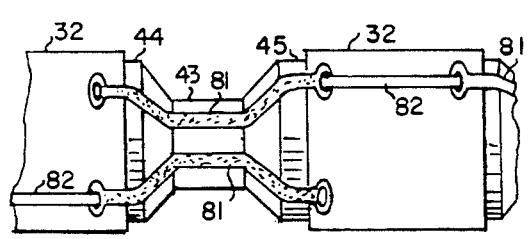
FIG. 12 is a schematic diagram illustrating how the parts of FIGS. 10 and 11 are applied to elements to form connectors.

Referring now to FIGS. 10 and 11, another form of connector is shown which comprises a saddle indicated generally by the reference character 81 in FIG. 10 and a connecting link indicated generally by the reference character 82 in FIG. 11. The saddle comprises a fabric strap 83 which may, for example, be of nylon, and two metal rings 84 and 85 fastened to opposite ends of the strap. The strap 82 may comprise a generally flat metal strap portion 86 opposite ends of which are bent over as shown at 87 and 88 in such a way as to cooperate with the rings 84 and 85. As shown in FIG. 12, two saddles 81 are placed over the body portion 43 of each spool side by side. The ends of the saddles extend over the flanges 44 and 45 as shown and lie on top of adjacent housings 32. When so placed, the cable 23 can be wound around the spool and over the saddle. When the elements are connected, one connecting link 82 is connected to the left ring of one of the saddles 81 so as to go to the next preceding element where it is hooked to a saddle for that element while the other connecting link 82 is connected to the right end of the other saddle 81 and goes on to the next succeeding element where it is hooked to a saddle for that element. In this arrangement, each connector joining two adjacent elements is in three pieces, that is, two saddles and one connecting link. Operation with this form of connector is substantially the same as that previously described. As the various cables unwind, the saddles are released from the spools and may fall away individually, with or without the connecting links.

Figure 13:
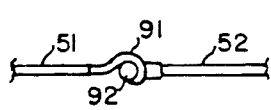
FIGS. 13 and 14 are schematic diagrams illustrating an alternate arrangement for joining the separate parts of a multi-part connector.
Figure 14:
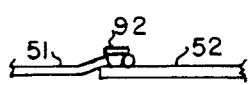

Referring now to FIGS. 13 and 14, there is shown a pin and hook type of connector which may be used either with the saddle and connecting link arrangement of FIGS. 10 and 11 or with the string and/or flexible cable arrangement shown in FIGS. 4 and 5. Assuming the latter, the end of each connector 51 may be provided with a hook 91 while the end of each connector 52 may be provided with a pin 92.

The joining of adjacent elements has been described so far as if there were but one connector between adjacent elements and this indeed is acceptable in many cases. However, in some cases it may be preferred to provide more than one connector between adjacent elements and this can be done readily by spacing them circumferentially. Operation remains the same as with a single connector.

Figure 15:
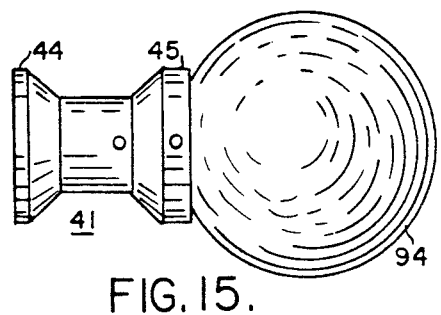
FIG. 15 is a schematic diagram illustrating an alternate form of element which may be used with the present invention; and, FIG. 16 is a schematic diagram of an alternate form of spool which may be used with the present invention.

Referring now to FIG. 15, there is shown the spool 41 attached to a sensor 94 which is generally spherical in shape instead of being generally cylindrical shaped as in the case of the sensor 31. The spherical shape may be advantageous in some situations where each element utilizes more than one electro-acoustic transducer. It is apparent that the present invention is equally applicable to use with such spherical sensors, or, for that matter, with sensors of other shapes.

Figure 16:
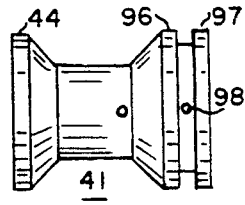

Referring now to FIG. 16, there is shown an alternate form of spool which may be used in the present invention. Instead of a single wide flange 45 to accommodate the aperture 47, the spool 41' includes two narrow spaced-apart flanges 96 and 97 between which there is an aperture 98 to accommodate the connecting cable.

Although the invention has been described in considerable detail for illustrative purposes, many modifications within the spirit of the invention will occur to those skilled in the art. It is therefore desired that the protection afforded by Letters Patent be limited only to the true scope of the appended claims.

What is claimed is:

1. An element releasing system comprising a plurality of elements positioned adjacent to each other in a substantially straight line and in a predetermined order from first to last, a plurality of connectors positioned so that one of said connectors overlays and is in engagement with each two adjacent elements, bridging any gap therebetween, and a plurality of flexible cables, one associated with each element and each having a first end and a second end, each of said cables being wound around its associated element and each connector in engagement therewith so as to bind said connectors to said elements and thereby join said elements to each other, said first end of each of said cables being fastened to its associated element, said second end of each of said cables except the first being connected to the next preceding adjacent element, whereby the application of a force to said second end of said first cable and said last element in a direction tending to separate said elements causes said cables to unwind sequentially beginning with said first cable thereby releasing said connectors one at a time and separating said elements which remain joined together and spaced apart by said cables.

2. A system in accordance with claim 1 in which said dables are multi-conductor cables providing electrical and mechanical connections between elements.

3. A system in accordance with claim 1 in which said system is deployed beneath the surface of a body of water and which includes a thruster connected to said second end of said first cable and a drogue connected to said last element for applying said force.

4. A system in accordance with claim 1 in which each of said elements comprises a spool and a sensor joined together.

5. A system in accordance with claim 4 in which each sensor comprises an electro-acoustic transducer and electronic equipment.

6. A system in accordance with claim 5 in which each of said sensors include a first generally cylindrical housing attached to said spool and containing said electronic equipment and also includes a second smaller generally cylindrical housing projecting from said first housing opposite to said spool and containing said electro-acoustic transducer.

7. A system in accordance with claim 5 in which each of said sensors includes a generally spherical housing containing said electronic equipment and at least one electro-acoustic transducer.

8. A system in accordance with claim 4 in which each of said connectors overlays and engages the spool and sensor of one of said elements and the spool of the next succeeding element.

9. A system in accordance with claim 8 in which each of said cables is wound around the spool of its associated element and around the connectors in engagement therewith.

10. A system in accordance with claim 9, in which each of said connectors comprises a first part overlying the spool and at least a part of the sensor of one of said elements and a second part overlying at least a part of the same sensor and the spool of the next succeeding element and in which said first and second parts are joined together where they overlie said sensor.

11. A system in accordance with claim 9 in which each of said connectors comprises first and second portions, one overlying the spool of each of two adjacent elements, each of said portions being provided with a fastening mechanism on at least one end thereof, and also comprises a third portion having a fastening mechanism at each end thereof for cooperation with said fastening mechanisms on said first and second portions.

12. A system in accordance with claim 9 in which each of said spools is hollow and defines a generally cylindrical interior chamber, each spool also having first and second radial apertures providing communication between said chamber and the exterior of said spool, and in which each of said cables is a multi-conductor cable, said first end of each cable passing through said first aperture in its associated spool to said chamber, said second end of each cable except the first passing through said second aperture in the next preceding spool, whereby each of said chambers, except the last, contains a first end of one cable and a second end of another cable, and in which said first and second ends in each chamber are connected to the associated sensor.

13. A system in accordance with claim 9 in which each of said spools is a generally cylindrical hollow tube having a radially extending flange on each end.

14. A system in accordance with claim 13 in which each of said spools is formed to define first and second radial apertures providing communication between the interior and exterior thereof, said first aperture being located between said flanges and said second aperture passing through one of said flanges.

15. A system in accordance with claim 9 in which each of said spools is a generally cylindrical hollow tube having a first radially extending flange on one end and second and third spaced apart radially extending flanges at the other end.

16. A system in accordance with claim 15 in which each of said spools is formed to define first and second radial apertures providing communication between the interior and exterior thereof, said first aperture being located between said first and second flanges and said second aperture being located between said second and third flanges.

* * * * *